United States Patent [19]

Singer et al.

[11] Patent Number: 5,171,603

[45] Date of Patent: * Dec. 15, 1992

[54] REDUCED FAT FOOD PRODUCT

[75] Inventors: Norman S. Singer, Highland Park, Ill.; Joseph Latella, London; Shoji Yamamoto, Prince Edward Island, both of Canada

[73] Assignee: John Labatt Limited, London, Canada

[*] Notice: The portion of the term of this patent subsequent to Mar. 29, 2005 has been disclaimed.

[21] Appl. No.: 855,564

[22] Filed: Mar. 23, 1992

Related U.S. Application Data

[63] Continuation of Ser. No. 568,744, Aug. 17, 1990, Pat. No. 5,098,728, which is a continuation-in-part of Ser. No. 367,261, Jun. 16, 1989, Pat. No. 4,961,953, which is a continuation of Ser. No. 127,955, Dec. 2, 1987, abandoned, which is a continuation-in-part of Ser. No. 606,959, May 4, 1984, Pat. No. 4,734,287.

[51] Int. Cl.$^5$ ................................................ A23J 1/00
[52] U.S. Cl. .................................. 426/572; 426/579; 426/580; 426/582; 426/589; 426/603; 426/656; 426/657; 426/804
[58] Field of Search ............... 426/656, 657, 804, 579, 426/572, 589, 580, 582, 603

[56] References Cited

U.S. PATENT DOCUMENTS 4,734,287 3/1988 Singer et al. ...................... 426/41

Primary Examiner—Joseph Golian
Assistant Examiner—Evan Federman
Attorney, Agent, or Firm—Marshall, O'Toole, Gerstein, Murray & Bicknell

[57] ABSTRACT

The present invention provides food products formulated with microparticulated protein which serves as a replacement for all or part of the fat and/or oil normally found in the food product. Food products of the invention include puddings, icings, sauces, spreads and processed cheeses.

1 Claim, 1 Drawing Sheet

REDUCED FAT FOOD PRODUCT

CROSS REFERENCE TO RELATED APPLICATIONS

This application is a continuation of our copending U.S. patent application Ser. No. 07/568,744 filed Aug. 17, 1990 which issued as U.S. Pat. No. 5,098,728, which was a continuation-in-part of our copending U.S. patent application Ser. No. 07/367,261 filed Jun. 16, 1989, which issued as U.S. Pat. No. 4,961,953 on Oct. 9, 1990 which was a continuation of our U.S. patent application Ser. No. 07/127,955, filed Dec. 2, 1987, now abandoned, which, in turn, was a continuation-in-part of our U.S. patent application Ser. No. 06/606,959 filed May 4, 1984, which issued as U.S. Pat. No. 4,734,287 on Mar. 29, 1988.

BACKGROUND

The present invention relates to reduced fat food product compositions which include a microparticulated protein product as described in our allowed U.S. patent application Ser. No. 07/367,261 filed Jun. 16, 1989, the entire disclosure of which is incorporated by reference herein.

SUMMARY OF THE INVENTION

The present invention provides reduced fat food products having all or part of the fat and/or oil content normally found in the food products replaced with a proteinaceous, water-dispersible, macrocolloid comprising substantially non-aggregated particles of denatured protein (microparticulated protein) having in a dry state a mean diameter particle size distribution ranging from about 0.1 to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character.

Food products which may have the fat and/or oil normally found in the food product replaced with the microparticulated protein described above include puddings, icings, sauces, spreads and processed cheeses such as jar cheese, sliced cheese and cheese loaf.

The present invention also provides a liquid coffee creamer consisting essentially of a proteinaceous, water-dispersible, macrocolloid comprising substantially non-aggregated particles of denatured protein having in a dry state a mean diameter particles size distribution ranging from about 0.1 to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character.

In addition, the present invention provides an enhanced skim milk based products having a mouth feel of milk products having a fat content greater than that of skim milk comprising a mixture skim milk and a proteinaceous, water-dispersible, macrocolloid comprising substantially non-aggregated particles of denatured protein having in a dry state a mean diameter particle size distribution ranging from about 0.1 to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character. A preferred enhanced skim milk comprises about 10 wt. % of the microparticulated protein.

DETAILED DESCRIPTION OF THE INVENTION

Figure 1:
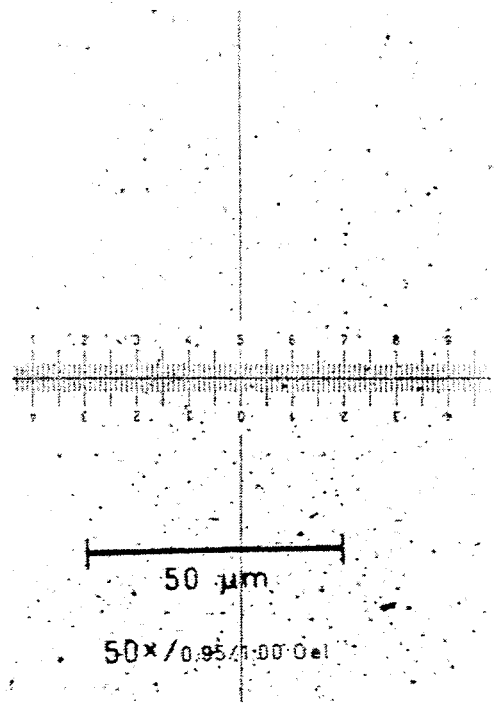
FIG. 1 illustrates a photomicrographic view at 1000 x magnification of microparticulated whey protein of the present invention.

The following examples relate to preferred methods and procedures for practicing the present invention. Example 1 relates to a preferred method for the production of microparticulated protein from the proteinaceous material present in acidified whey. Example 2 relates to a preferred method for the production of microparticulated protein from casein micelles and the proteinaceous material present in egg white. Example 3 relates to the production of microparticulated protein from the proteinaceous material in whey. Example 4 relates to the preparation of a pudding. Example 5 relates to the preparation of an icing. Example 6 relates to the preparation of sauce. Example 7 relates to the preparation of a liquid coffee creamer product. Example 8 relates to the preparation of a skim milk enhancer. Example 9 relates to the preparation of a blended jar cheese product. Example 10 relates to the preparation of a cheese loaf. Example 11 relates to the preparation of a reduced fat American or Swiss flavor sliced cheese. Example 12 relates to the preparation of a reduced fat table spread.

EXAMPLE 1 Microparticulated Protein Produced From Acidified Whey

Microbiologically, aromatically and particulately clean water produced by a reverse osmosis process is added to a sanitary tank.

Commercially available liquid whey protein concentrate is treated by ultrafiltration and evaporation until the concentration of protein is about 50–55% by weight, on a dry basis. The whey protein concentrate is added to the water in the sanitary tank with agitation avoiding aeration through the suction side of a positive displacement pump to achieve a solids concentration of about 37% solids for the mixture.

As this mixture is recirculated back to the sanitary tank, a dilute solution for food acid (acetic, lactic, citric or hydrochloric; alone or in combination) is added through an in-line mixer to lower the pH from about 6.8 to about 4.4±0.05.

The pH adjusted mixture is then rigorously deaerated in a Versator deaerator/homogenizer and bottom fed into a holding tank which is equipped for non-aerating agitation.

The deaerated mix is then pumped (300 lbs/hr) from the holding tank, by a positive displacement pump through an in-line strainer (300 μm cheesecloth) and a mass flow meter, into a plate heat exchanger which heats the mixture to about 165°–180° F., a temperature lower than the target peak temperature which is achieved within a heat and shear generating apparatus ("microcooker"). Flow is manually-controlled based on readings from the in-line flow-meter.

The heated mixture is pumped directly from the plate heat exchanger into the microcooker apparatus as described in U.S. Pat. No. 4,823,396 with the exception that the inlet and outlet ports have been interchanged or exchanged, i.e., the inlet port is disposed where the outlet port is shown in the patent drawing and the outlet port is located at the bottom of the bowl shaped vessel and the temperature of the mixture is raised to about 200° F. within less than 10 seconds under high shear conditions. Rigorous temperature control of the mixture is maintained at 200° F. by means of a cascade control loop. The control loop senses the temperature of the product exiting the microcooker and maintains it at 200° F. by adjusting the temperature of the mixture leaving the plate heat exchanger.

The speed of the rotor in the microcooker is held constant, for example, at about 3715 rpm. At this rpm, the shear rate is about 27,000 reciprocal seconds at the tips of the rotor which has a diameter of approximately 7 inches.

After exiting the microcooker apparatus, the product flows directly into an eccentric scraped surface heat exchange and is cooled with vigorous agitation to less than 130° F. The cooled product then flows through additional heat exchangers (scraped surface of plate type) to reduce its temperature to less than 55° F.

EXAMPLE 2 Microparticulated Protein Produced from Casein Micelles and Egg White

Microbiologically, aromatically and particulately clean water (16.83 wt. %) produced by a reverse osmosis process is heated in a sanitary tank to about 120° F.

Commercially available apple pectin (0.35 wt. %) dry-blended with sugar (5.0 wt. %) to assure its complete dispersion and is then added to the water in the sanitary tank by means of a high shear solid/liquid Triblender mixer. This mixture is held at about 120°-140° F. with agitation for about 5 minutes to assure hydration and dissolution of the pectin. The mixture is then cooled to less than about 100° F.

Liquid egg white is ultrafiltered using membrane filters having a molecular weight cut-off of about 10,000. The ultrafiltration reduces the total volume of the liquid egg white by about 50% and effectively doubles the protein content and halves the sodium content of the egg white. The treated egg white (55 wt. %) is added to the pectin solution through the suction side of a positive displacement pump with controlled agitation to avoid aeration.

Condensed skim milk (22.65 wt. %) is then added to the mixture through the suction side of a positive displacement pump.

As this mixture is recirculated back to the sanitary tank, a dilute solution of food acid (0.17 wt. %) (acetic, citric, lactic or hydrochloric; alone or in combination) is added through an in-line mixer to lower the pH from about 7 to about 6.20±0.05.

The pH adjusted mix is then rigorously deaerated in a Versator deaerator and bottom-fed into a holding tank which is equipped for non-aerating agitation.

The deaerated mixture is then pumped (600 lb/hr) from the holding tank, by a positive displacement pump thorugh an in-line strainer (300 μm cheesecloth) and a mass flow meter into a plate heat exchanger which heats the mixture to about 165° F., a temperature lower than the target peak temperature which is achieved within the microcooker apparatus described in Example 1. At this lower temperature no coagulate will have developed. Flow is manually-controlled based upon readings from the in-line flow-meter.

The heated mixture is pumped directly from the plate heat exchanger into the microcooker apparatus and the temperature of the mixture is raised to about 185° F. within less than about 10 seconds under high sheer conditions. Rigorous temperature control is maintained over the temperature of the mixture in the microcooker apparatus by a cascade control loop. The control loop senses the temperature of a product exiting the microcooker and holds the temperature constant by regulating the temperature of the mixture leaving the plate heat exchanger.

The speed of the rotor in the microcooker is held constant at about 5400 rpm. At this rpm, the shear rate is about 40,000 reciprocal seconds at the tips of the rotor which has a diameter of approximately 7 inches.

After exiting the microcooker apparatus, the product flows directly into an eccentric scraped surface heat exchanger and is cooled with vigorous agitation to less than 130° F. The cooled product then flows through additional heat exchangers (scraped surface or plate type) to reduce its temperature to less than 55° F.

EXAMPLE 3 Microparticulated Protein Produced From Whey

Commercially available liquid whey is treated by ultrafiltration and evaporation to give a mixture having about 42% by weight solids and about 50%-55% by weight protein, on a dry basis. The resulting whey protein concentrate is deaerated in a Versator deaerator and bottom fed into a sanitary tank equipped for a non-aerating agitation.

The deaerated mixture is then pumped (600 lbs/hr), by a positive displacement pump through an in-line stainer (300 μm cheesecloth), a mass flow meter and plate heat exchanger, which raises the temperature of the mixture to about 170° F., into a heated holder device.

The heated holding device includes two concentric scraped surface heat exchangers connected in series. Each heat exchanger provides a hold time of about 3.6 minutes at a flow rate of about 300 lbs/hr. both of these heat exchangers are heated to a maintain the hold temperature set by the plate heat exchanger.

The mixture is then pumped from the holding device to an eccentric scraped surface heat exchanger. This scraped surface heat exchanger cools the mixture to a temperature of about 165° F., a temperature lower than the target peak temperature inside a heat and high shear generating apparatus (microcooker). The mixture then flows directly into the microcooker apparatus as described in Example 1 and the temperature of the mixture is raised to 200° F. within 10 seconds under high shear conditions. Rigorous temperature control at 200° F. is maintained in the microcooker by a cascade control loop. The control loop senses the temperature of a product exiting the microcooker and holds a temperature constant by regulating the temperature of the mixture leaving the eccentric scraped surface heat exchanger.

The speed of the rotor in the microcooker is held constant at about 5200 rpm. At this rpm, the shear rate is about 40,000 reciprocal seconds at the tips of the rotor which has a diameter of approximately 7 inches.

After exiting the microcooker apparatus, the product flows directly into an eccentric scraped surface heat exchanger and is cooled with vigorous agitation to less than 130° F. The cooled product then flows through an additional heat exchanger (scraped surface or plate type) to reduce its temperature to less than 55° F.

EXAMPLE 4 Preparation of a Pudding

A chocolate pudding is produced from the ingredients listed in Table 1.

TABLE 1

| Pudding | |
|---|---|
| Ingredients | Wt. % of Composition |
| Water | 3-59 |
| | preferred 3-30 |
| Milk | 4.5-60 |
| | preferred 30-60 |
| Food Starch | 2-5 |
| | preferred 2-4 |
| Color | 0-0.3 |
| Cocoa Powder | 1-5 |
| | preferred 2-4 |
| Microparticulated Protein | 7-20 |
| | preferred 10-15 |
| Flavor | optional, as desired |
| Antimicrobials | optional, as needed |
| Sugar | 10-25 |
| | preferred 15-25 |

In the ingredients listed above milk may include ultrafiltered or condensed skim milk, nonfat dry milk, sodium caseinate, calcium caseinate, magnesium caseinate, milk protein concentrate, calcium sodium caseinate; color may include natural or artificial colors such as caramel color, turmeric or annatto; sugar may include cane sugar, high fructose corn syrup or fondant sugar; food starch may include modified and unmodified corn, rice, tapioca or potato starch and gums may include xanthan, sodium and propylene glycol alginate, locust bean, guar gum, cellulose gums or microcrystalline cellulose.

To prepare the pudding, milk (Dean's skim milk, 53.15%) and water (10%) were weighed and mixed. The color (10%) and optional flavors were then dispersed in the milk and water to give an aqueous mixture. Food Starch (Staley pure food starch, 3.45%), Gum (Keltrol xanthan, 0.1%) and cocoa powder (DeZann D11CE 2%) were blended and then added to the aqueous mixture which was thoroughly blended.

Microparticulated protein (either the microparticulated protein of Example 2 or 3, 15%) was dispersed into the mixture and after all the ingredients were combined, the mixture was heated to a temperature of about 185° F. The heated mixture is then cooled and packaged according to well known procedures.

EXAMPLE 5 Preparation of a Chocolate Icing

A chocolate icing was produced from the ingredients listed in Table 2(a).

TABLE 2(a)

| Chocolate Icing | |
|---|---|
| Ingredients | Wt. % of Composition |
| Microparticulated Protein (Example 1) | 13.23 |
| High Fructose Corn Syrup (Staley) | 52.50 |
| Sugar | 13.40 |
| Corn Syrup Solids 35R | 5.57 |

TABLE 2(a)-continued

| Chocolate Icing | |
|---|---|
| Ingredients | Wt. % of Composition |
| Modified Food Starch (Staley Maltodextrin) | 4.26 |
| Flavor | 0.60 |
| Cocoa Powder | 4.24 |
| Water | 6.00 |

The sugar, corn syrup solids, starch and cocoa were combined and blended. Water, high fructose corn syrup, and flavor were added to the blend and the mixture was blended for about 2 minutes. The microparticulated protein is then slowly added to the blend and the chocolate icing was refrigerated until used.

A ready-to-spread chocolate icing is produced from the ingredients listed in Table 2(b).

TABLE 2(b)

| Ingredients | Wt. % of Composition |
|---|---|
| Water | 5-15 |
| | preferred 8-13 |
| Gums | 0.5-4 |
| | preferred 0.5-3 |
| Food Starch | 1-5 |
| | preferred 1-3 |
| Microparticulated Protein | 7-20 |
| | preferred 10-15 |
| Maltodextrin and Corn Syrup Solids | 5-15 |
| | preferred 5-10 |
| Sugar | 50-89 |
| | preferred 50-60 |
| Cocoa Powder | 1-5 |
| | preferred 2-4 |
| Milk Solids | 7-15 |
| | preferred 7-12 |
| Flavors | optional, as desired |
| Antimicrobial | optional, as needed |

In the above ingredients list, milk solids may include nonfat dry milk, sodium, calcium or magnesium caseinate or milk protein isolates or hydrolysates; gums may include xanthan, carbomethoxycellulose, cellulose gel, locust bean, guar, sodium or propylene glycol alginates, pectin, agar or gelatin; sugar may include cane sugar, invert sugar, high fructose corn syrup or corn syrup and maltodextrin may be 1 DE to 36 DE.

To prepare the spreadable icing, sugar (C&H powdered sugar, 57.0%), maltodextrin and corn syrup solids (American Maize, Lodex 5 and/or Staley Stan-Dri 20, 6.45%), milk solids (Land O'Lakes nonfat dry milk, 11.20%) cocoa powder. (DeZaan D11CM, 3.00%) and gum (Ketrol xanthan, 1.15%) were combined and blended. Blend water, gums, starch, microparticulated protein, maltodextrin and corn syrup solids. Cook to 180° F. for 15 seconds and cool to 86° F. Dry blends milk solids, cocoa powder and sugar. Add dry blend to Mobart mixer; blend at medium speed for 5 minutes (until well blended). Cool to 45° F. and store. Water (10.0%) and flavor (as desired) were added to the blend and the combined mixture was thoroughly blended. Microparticulated protein (the microparticulated protein of example 2 or 3, 10.0%) was added to the mixture and the product was packaged according to well known procedures.

EXAMPLE 6 Preparation of Hollandaise-Type Sauce

A hollandaise-type sauce was produced from the ingredients listed in Table 3.

TABLE 3

| Hollandaise-Type Sauce | |
|---|---|
| Ingredients | Wt. % of Composition |
| Cultured Lowfat Buttermilk Deans | 53.0 |
| Xanthan Gum Kelco | 0.12 |
| Corn Syrup Solids, 36DE | 3.0 |
| Milk Powders | 2.2 |
| Microparticulated Protein (Example 2) | 30.0 |
| Whole Egg | 4.0 |
| Acidulant (Vinegar, lemon juice, proportions) | 3.9 |
| Coloring | 0.98 |
| Flavor | 2.8 |

To prepare the sauce, buttermilk was added to a jacketed mixing container fitted with a turbine blade and the gum, starch, corn syrup solids and milk powders were slowly added under agitation (about 1000 r.p.m.), mixed from about one minute, and then the mixture is deaerated under vacuum for about 2-10 minutes. The microparticulated protein (Example 2) and egg were added and blended for 2 minutes to achieve a uniform viscous fluid. The acidulant was then slowly added to the mixing vortex of the viscous fluid followed by the addition of the remaining ingredients. The complete mixture was then heated to 185° F. and maintained at 185° F. for about 40 seconds. The flavor was added and it was cooled to 165° F. and then packaged according to well known procedures.

EXAMPLE 7 Coffee Liquid Creamer Product

A volume to volume replacer for half and half in hot coffee was produced by adding a liquid microparticulated protein of Example 3 directly to the hot black coffee.

EXAMPLE 8

Skim Milk Enhancer

A milk drink having the mouth feel of 3.7% fat milk was produced by adding 10 wt. % of the microparticulated protein of Example 3 directly to skim milk.

EXAMPLE 9

Preparation of a Reduced Fat Blended Jar Cheese

A blended jar cheese product was produced from the ingredients listed in Table 4.

TABLE 4

| Jar Cheese Product | |
|---|---|
| Ingredients | Wt. % of Composition |
| Cheese Blend (4 equal parts of low moisture part skim Mozzarella, Cheddar, Muenster and Skim Cheese) | 41.1 |
| Microparticulated Protein (Example 3) | 50.0 |
| Emulsifiers (Disodium Phosphate 0.2, Sodium aluminum phosphate 2.0, Sodium Citrate 0.2, Hexametaphosphate 0.2) | 2.6 |
| Salt | 0.3 |
| Water | 6.0 |

The selected cheese blend was shredded to facilitate blending, the emulsifiers were added and the mixture was blended. The blended mixture was added to a preheated single screw cooker at about 150°-165° F. and the temperature was increased to 160° F. The microparticulated protein was added to the mixture and the temperature was stabilized at about 165°-175° F. The combined mixture was then packaged and cooled to 45° F.

EXAMPLE 10

Preparation of a Reduced Fat Process Cheese Loaf

Following the procedures outlined in Example 9 above, a blended processed cheese loaf was produced from the ingredients listed in Table 5.

TABLE 5

| Processed Cheese Loaf | |
|---|---|
| Ingredients | Wt. % of Composition |
| Cheese Blend (4 equal parts of Mozzarella, Cheddar, Muenster and Skim Cheese) | 66.3 |
| Microparticulated Protein (Example 3) | 25.0 |
| Emulsifiers (Disodium Phosphate 0.2, Sodium aluminum phosphate 2.0, Sodium Citrate 0.2) | 2.4 |
| Salt | 0.3 |
| Water | 6.0 |

EXAMPLE 11

Reduced Fat American or Swiss Flavor Sliced Cheese

An American or Swiss flavor sliced cheese is prepared from the ingredients listed in Table 6.

TABLE 6

| SLICED CHEESE | |
|---|---|
| Ingredients | Wt. % of Composition |
| Skim Cheese | 54-62% |
| Condensed Sweet Whey | 0-25% |
| Water | 0-18% |
| Microparticulated Protein | 0-30% |
| Cheese Flavor | 0.5-4% |
| Sodium Citrate | 0-3% |
| Maltodextrin | 0-5% |
| Sodium Chloride/Potassium Chloride | 0-1.5% |
| Acidulant | 0-1.5% |
| Anhydrous Milkfat | 0-1.5% |
| Disodium Phosphate | 0-2% |
| Sodium Aluminum Phosphate | 0-2% |
| Gums | 0-1% |
| Sorbic Acid | 0-0.2% |

In the above listed ingredients skim cheese may include cheese and other dairy proteins such as no-fat skim cheese, mozzarella cheese, cheddar, monterey jack, swiss, colby, muenster, brick, nonfat dry milk, whey protein concentrate (dry or fluid), ultrafiltered sweet whey, condensed skim milk, casein or caseinates, ultrafiltered milk 2× or 8× of dried skim milk powder; milk fat may include butteroil, plastic cream, cream, dried cream, butter or margarine; gums may include carrageenan, xanthan, carob bean, gelatin, guar gum, sodium alginate, gum arabic, Konjac flour, tragacanth, pectin, microcrystalline cellulose, sodium carboxymethylcellulose, gum karaya or propylene glycol aginate; emulsifiers may include monosodium phosphate, dipotassium phosphate, disodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate or sodium potassium tartrate; acidulants may include vinegar, lactic acid, citric acid, acetic acid or phosphoric acid; and antimicrobials may include sorbic acid, potassium sorbate, sodium sorbate, sodium propionate, calcium propionate or nisin.

To prepare the sliced cheese, skim cheese (56.6%) was ground to shredded in standard cheese grinding equipment. The ground cheese, condensed sweet whey (15.6%), microparticulated protein (produced according to the procedures of Example 3, 9.3%), maltodextrin (1.3%), water (10.6%), salt (1%) and anhydrous milkfat (0.5%) were blended together in a blender until the mixture was homogeneous. The blended cheese was added to a steam injected, single screw or twin screw cooker or a continuous cooker with the emulsifying salts (disodium phosphate 0.5%, sodium aluminum phosphate 0.5%, and sodium citrate 2%) and heated to a temperature of about 165°–190° F. and maintained at that temperature for about 7–15 minutes. After the cheese reached the desired cook temperature, the acidulant (20%) lactic acid, 0.8%) and cheese flavor (1.2%) were added and thoroughly mixed into the host mass. The cheese was then packaged according to well known methods.

EXAMPLE 12

Reduced Fat Table Spread

A reduced fat table spread was produced from the ingredients listed in Table 7.

TABLE 7

| Table Spread | |
|---|---|
| Ingredients | Wt. % of Composition |
| Water | 26.6 |
| Potassium caseinate | 1.9 |
| Gelatin | 0.3 |
| Salt | 1.5 |
| Sodium Benzoate | 0.1 |
| Microparticulated Protein (Example 3) | 30.0 |
| Lecithin | 0.3 |
| Monodiglycerides | 0.6 |

TABLE 7-continued

| Table Spread | |
|---|---|
| Ingredients | Wt. % of Composition |
| Oil | 38.7 |
| Flavor | 0.6 |

To prepare a reduced fat table spread the above listed dry ingredients: salt, sodium benzoate, gelatin and potassium caseinate were blended with hot water (75° C.) and then cooled to 40° C. to provide a water phase. The water phase was then blended with the microparticulated protein.

A mixture of oil and emulsifiers were heated to 70° C. and then cooled to 40° C. to give an oil phase. The water phase containing the microparticulated protein and oil phase was then blended together in a high shear mixer which was cooled in order to lower the temperature of the mixture to 10° C. for 15 minutes to give the reduced fat table spread.

Numerous modifications and variations in practice of the invention are expected to occur to those skilled in the art upon consideration of the foregoing descriptions of preferred embodiments thereof. Consequently, only such limitations should be placed upon the scope of the invention as appear in the appended claims.

What is claimed is:

1. In an edible food product containing fats in concentration sufficient to make an organoleptic contribution to said product, the improvement comprising replacing at least a portion of said fats by a hydrated proteinaceous macrocolloid comprising substantially non-aggregated particles of denatured protein having means diameter particle size distributions, in a dry state ranging from about 0.1 micron to about 2.0 microns, with less than about 2 percent of the total number of particles exceeding 3.0 microns in diameter, and wherein the majority of said particles are spheroidal as viewed at about 800 power magnification under a standard light microscope, whereby the hydrated particles contribute a substantially smooth, emulsion-like organoleptic character to said product.

* * * * *